(12) United States Patent
Hanyu et al.

(10) Patent No.: US 6,258,006 B1
(45) Date of Patent: Jul. 10, 2001

(54) TRANSMISSION, VEHICLE, HYBRID VEHICLE, AND CONTROL UNIT THEREFOR

(75) Inventors: Tomoyuki Hanyu; Hiroshi Sakamoto, both of Hitachi; Toshimichi Minowa, Mito; Taizo Miyazaki; Ryoso Masaki, both of Hitachi, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/498,065

(22) Filed: Feb. 4, 2000

(30) Foreign Application Priority Data

Feb. 5, 1999 (JP) .................................................. 11-028117

(51) Int. Cl.[7] .................................................. B60K 41/02
(52) U.S. Cl. .................................................. 477/5; 475/5
(58) Field of Search ....................................... 475/5; 477/5

(56) References Cited

U.S. PATENT DOCUMENTS 2,924,991 * 2/1960 Whiting ..................................... 475/5
6,142,907 * 11/2000 Minowa et al. ........................... 477/5

FOREIGN PATENT DOCUMENTS 7-135701 5/1995 (JP).

* cited by examiner

*Primary Examiner*—Dirk Wright
(74) *Attorney, Agent, or Firm*—Crowell & Moring LLP

(57) ABSTRACT

Disclosed is a transmission comprising a first power transfer path for transferring an output of an engine to a vehicle driving shaft through a planetary gear connected to a motor, a second power transfer path for transferring the output of the engine to the vehicle driving shaft through gears and, and a power transfer switch which switches over the first and second power transfer paths from one to the other. In a hybrid vehicle wherein an engine, a motor and a generator are connected to a planetary gear, a follow-up loss caused by the generator is avoided in the case where the engine stops and the vehicle travels with the motor alone. In high-speed running, it is avoided that an electric energy for stopping the rotation of the generator is consumed. Further, torque assist by the generator is not restricted by constraints of the planetary gear.

13 Claims, 13 Drawing Sheets

TRANSMISSION, VEHICLE, HYBRID VEHICLE, AND CONTROL UNIT THEREFOR

BACKGROUND OF THE INVENTION

The present invention relates to a transmission composed of a motor, a differential mechanism and a power coupling mechanism, as well as a vehicle using the same.

As a drive system capable of attaining a low power consumption of an engine there is known a hybrid vehicle which utilizes a driving force of a motor.

As to the hybrid vehicle, there has been proposed a system which uses two motors and one planetary gear. For example, in Japanese Patent Laid Open No. Hei 7-135701 there is described a method in which a control is made by a generator so that a driving force of an engine is inputted to a planetary gear and so that the vehicle is driven by a driving force obtained from an output shaft of the planetary gear.

In the above method, out of three constituent gears of the planetary gear, other gears than a gear connected to a shaft of the engine are controlled on their speed so as to stop the gear connected to the engine shaft, thereby realizing a vehicular running with a motor alone.

In high-speed running, a shaft of the generator is fixed electrically and the driving force of the engine is transmitted to a vehicle driving shaft through the other gears in the planetary gear than the gear connected to the engine shaft.

In the above method, however, there occurs a loss due to follow-up rotation of the generator during vehicular running with the motor, resulting in consumption of the driving motor output.

In high-speed running, moreover, an electric energy for stopping the rotation of the generator is consumed.

Further, torque assist by the generator is restricted due to a constraint based on the planetary gear.

SUMMARY OF THE INVENTION

The present invention has been accomplished for eliminating the above-mentioned drawbacks and it is an object of the invention to attain a high degree of efficiency by diminishing a loss and an electrical loss both caused by follow-up rotation of a motor in a vehicle having an engine and the motor and make it possible to effect torque assist by a generator irrespective of the vehicle speed.

The above object is achieved by a transmission comprising; a first power transfer path for transferring an output of an internal combustion engine to a vehicle driving shaft through a differential mechanism in which power of an electric rotary machine is transferred to one of rotary elements; a second power transfer path for transferring the output of the internal combustion engine to the vehicle driving shaft through gears; and a power transfer switching means for switching over the first and second power transfer paths from one to the other.

The above object is achieved also a vehicle having an internal combustion engine and an electric rotary machine, the vehicle comprising: a vehicle driving shaft to which are fixed at least a high speed gear and a low speed gear; a planetary gear having at least three rotary elements, of which a first rotary element is connected to the low speed gear and a second rotary element is connected to a rotating shaft of the electric rotary machine; and a dog clutch having at least three rotary elements, of which a first rotary element is connected to a rotating shaft of the internal combustion engine, a second rotary element is connected to the high speed gear, and a third rotary element is connected to a third rotary element of the planetary gear; the dog clutch having a mechanism for selectively connecting the first rotary element thereof to the second or the third rotary element thereof and for neutralizing the first rotary element relative to the second and third rotary elements.

Further, the above object is achieved by a vehicle having an internal combustion engine and a motor generator, the vehicle comprising: a first power transfer path for transferring an output of the internal combustion engine to a vehicle driving shaft through a differential mechanism in which power of the motor generator is transferred to one of rotary elements; a second power transfer path for transferring the output of the internal combustion engine to the vehicle driving shaft through gears; and a dog clutch for switching over from one to another among a first mode which selects the first power transfer path, a second mode which selects the second power transfer path, and a neutral mode which separates the internal combustion engine from the first and second power transfer paths.

Further, the above object is achieved by a hybrid vehicle comprising: an internal combustion engine; a plurality of electric rotary machines; a first drive path through which an output obtained by the addition of an output of the internal combustion engine and an output of the first electric rotary machine is transferred to a vehicle driving shaft; a second drive path through which an output obtained by subtracting one of an output of the internal combustion engine and an output of the second electric rotary machine from the other is transferred to the vehicle driving shaft; and means for selecting either the first or the second drive path.

Further, the above object is achieved by a control unit provided in a hybrid vehicle, the hybrid vehicle comprising: an internal combustion engine; an electric rotary machine; a vehicle driving shaft to which are fixed at least a high speed gear and a low speed gear; a planetary gear having at least three rotary elements, of which a first rotary element is connected to the low speed gear and a second rotary element is connected to a rotating shaft of a motor generator; and a dog clutch having at least three rotary elements, of which a first rotary element is connected to a rotating shaft of the internal combustion engine, a second rotary element is connected to the high speed gear, and a third rotary element is connected to a third rotary element of the planetary gear; the dog clutch having a mechanism for selectively connecting the first rotary element thereof to the second or the third rotary element thereof and for neutralizing the first rotary element relative to the second and third rotary elements, wherein the number of rotation of the third rotary element in the dog clutch is controlled in accordance with a detected number of rotation of the vehicle driving shaft and by controlling the number of rotation of the electric rotary machine, and the first and third rotary elements in the dog clutch are connected together upon substantial coincidence in the number of rotation of the two.

DESCRIPTION OF THE PREFERRED EMBODIMENTS

Embodiments of the present invention will be described hereinunder with reference to the accompanying drawings.

Figure 1:
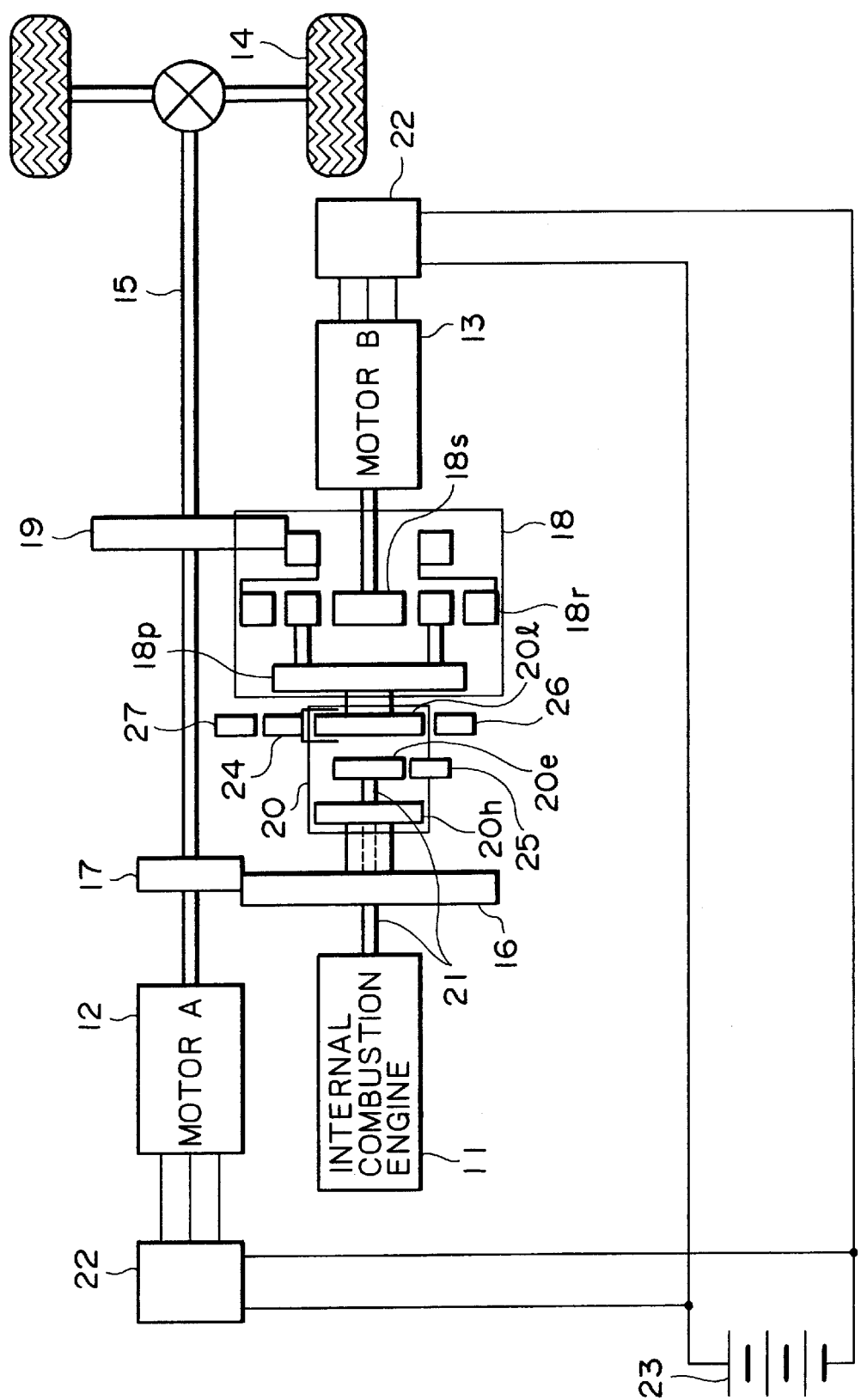
FIG. 1 illustrates a system configuration of a hybrid vehicle according to an embodiment of the present invention.

FIG. 1 illustrates a vehicle embodying the present invention with a transmission according to the invention mounted thereon. In the same figure, an engine 11 is an internal combustion engine. The internal combustion engine indicates an engine in which combustion gas is a working fluid. Examples thereof include a reciprocating engine, a rotary engine, a gas turbine, and a jet engine. The engine used in this embodiment is a reciprocating engine.

Motors A12 and B13, when an electric energy is given thereto, release a kinetic energy, while when a kinetic energy is given thereto, they convert it into an electric energy. Wheels 14 are connected to a vehicle driving shaft 15.

A high speed engine-side gear 16 is a meshing gear and a high speed vehicle-side gear 17 is also a meshing gear and is in mesh with the gear 16. The high speed vehicle-side gear 17 is fixed onto the vehicle driving shaft 15.

A planetary gear 18 having a differential function is made up of a sun gear 18s, a planetary carrier 18p, and a ring gear 18r. A low speed vehicle-side gear 19 is a meshing gear and is in mesh with the ring gear 18r in the planetary gear 18. The low speed vehicle-side gear 19 is fixed onto the vehicle driving gear 15.

A dog clutch 20 has a function of connecting an engine output shaft 21 to the high speed engine-side gear 16 or to the planetary carrier 18p in the planetary gear 18 or neutralizing the same shaft. The dog clutch 20, which corresponds generally to a clutch, is constituted by a gear train With the dog clutch, components to be coupled can be coupled using a small power if both components are equal in the number of rotation.

The dog clutch 20 is composed of an engine-side transfer element 20c connected to the engine output shaft, a high speed-side transfer element 20h connected to the high speed engine-side gear 16, and a low speed-side transfer element 20l connected to the planetary carrier 18p. The engine-side transfer element 20c is disposed between the high speed-side transfer element 20h and the low speed-side transfer element 20l. The high speed engine-side gear 16 and the high speed-side transfer element 20h are connected with each other through a hollow pipe, with the engine output shaft 21 extending through the hollow pipe. The engine output shaft 21 can be shortened by disposing the engine-side transfer element 20e between the high speed-side transfer element 20h and the low speed-side transfer element 20l. The overall length of the dog clutch 20 is set small so that the dog clutch can be mounted more easily.

The motor A12 is connected to the vehicle driving shaft 15, while the motor B13 is connected to the sun gear 18s of the planetary gear 18. A motor control unit 22, which controls the motors A12 and B13, is supplied with energy from a battery 23. The clamping device 24 has a function of stopping the rotation of the low speed-side transfer element 20l and restraining the same element. Generally, a band brake or a multiple-disc clutch is used as the clamping device, but in a hybrid vehicle not having any special oil pressure source it is desirable to use a clamping device which is driven with an electric energy, using a motor for example.

A state-of-connection detecting device 25 judges a state of connection of a power transfer switching means. A number-of-rotation detecting device 26 detects the number of rotation of the low speed-side transfer element 20l or of the planetary carrier 18p in the planetary gear 18. The number of rotation of the planetary carrier 18p can also be obtained from the number of rotation of the motor A12 and that of the motor B13, A clamping state detecting device 27 judges the state of the clamping device 24.

The transmission according to the configuration illustrated in FIG. 1 has the following features.

Firstly, there can be realized a vehicular running at a high efficiency and a low fuel consumption.

In the case where the vehicle is driven with the motor A12 alone, loss can be diminished during vehicular running by maintaining the engine-side transfer element 20e in a neutral state. The torque of the motor A12 is transmitted to the planetary gear 18 via the gear 19, but a loss caused by follow-up rotation of the motor B13 is nearly zero.

By keeping the engine-side transfer element 20e neutral, the inertia of the planetary carrier 18p in the planetary gear 18 comes to be based on gear only, whereas the inertial of the sun gear 18s is large because the motor B13 is connected thereto. In the planetary gear 18, therefore, the planetary carrier 18p of a low resistance based on inertia is turned due to torque balance, while the sun gear 18s remains stopped. Since the motor B13 is off, a loss caused by follow-up rotation of the motor B13 with rotation of the motor A12 is nearly zero and the torque of the motor A12 can be transmitted efficiently to the wheels 14. Besides, an electrical loss is also nearly zero because it is not necessary to provide an electric current to the motor B13.

Where the vehicle is driven by the output of the engine, a vehicular running at a reduced loss can also be effected by keeping the engine-side transfer element 20e coupled with the high speed-side transfer element 20h.

Since the engine-side transfer element 20e is in a coupled state with the high speed-side transfer element 20h, the driving force of the engine 11 is transferred efficiently to the wheels 14 via a pair of gears which are the high speed engine-side gear 16 and the high speed vehicle-side gear 17.

Since the vehicle speed is high and the load is large, the engine 11 can be used in a highly efficient region. Moreover, since the low speed-side transfer element 20l is in a no-load state, the motor B13 is off and a follow-up loss and an electrical loss are nearly zero.

Secondly, the accelerating performance can be improved.

In a motor travel mode wherein the vehicle is driven by the motor A12, when a torque higher than an allowable torque of the motor A12 is required, the torque of the motor B13 can be transmitted to the vehicle driving shaft 15 by fixing the low speed-side transfer element 20l with use of the clamping device 24.

Likewise, with the engine 11 in operation, if a torque larger than the sum of an allowable torque of the engine 11 and that of the motor A12 is required, the torque of the motor B13 can be transmitted to the vehicle driving shaft 15 by fixing the low speed-side transfer element 20l with use of the clamping device 24.

Since the motor B13 is connected to the sun gear 18s in the planetary gear 18, the torque generated by the motor B13 is amplified and transmitted to the vehicle. Therefore, a motor of a small capacity can be selected as the motor B13. Besides, since torque assist can be done by the motor B13, it is also possible to use a motor of a small capacity as the motor A12.

Thirdly, it is possible to effect a highly efficient power generation.

Since the motors A12 and B13 can assist torque each independently, it is, conversely, also possible to absorb torque and generate power in an independent manner.

When the capacity of the battery 23 is extremely low, the low speed-side transfer element 20l is fixed by the clamping device 24 and power generation is performed by both motors A12 and B13. At this time, the engine 11 is forced to operate at a high load, and since a highly efficient region is present on a high load side of the engine, there is attained a high overall efficiency in power generation. Moreover, a large regenerative braking torque can be obtained because it is possible to effect a regenerative braking simultaneously with two motors. Thus, there is attained a high energy recovery efficiency.

Fourthly, the vehicle can travel even in the event of failure of a motor.

In the event of failure of the motor A12, thus affording no output, the planetary carrier 18p in the planetary gear 18 is fixed by the clamping device 24, allowing the vehicle to travel with the torque of the motor B13.

For starting the engine 11 in a stopped state of the vehicle, the engine-side transfer element 20e is connected to the high speed-side transfer element 20h and the torque of the motor B13 is transmitted to a crank shaft of the engine via the high speed gears 16 and 17 to effect cranking. Cranking can also be performed by connecting the engine-side transfer element 20e to the low speed-side transfer element 20l and disengaging the clamping device 24.

In the event of failure of the motor B13, affording not output, the engine-side transfer element 20e is made neutral and the vehicle is allowed to travel with the torque of the motor A12. At this time, the engine-side transfer element 20e is connected to the high speed-side transfer element 20h and the torque of the motor A12 is transmitted to the crank shaft of the engine via the high speed gears 16 and 17 to effect cranking, thereby causing the engine 11 to start operating.

If no output is obtained due to failure of both motors A12 and B13, the engine-side transfer element 20c is made neutral if the vehicle is running, whereby the vehicle can be stopped safely without stopping the engine 11.

The following description is now provided about a basic processing method for controlling the engine 11 and the motors A12 and B13 in each operation mode.

Figure 2:
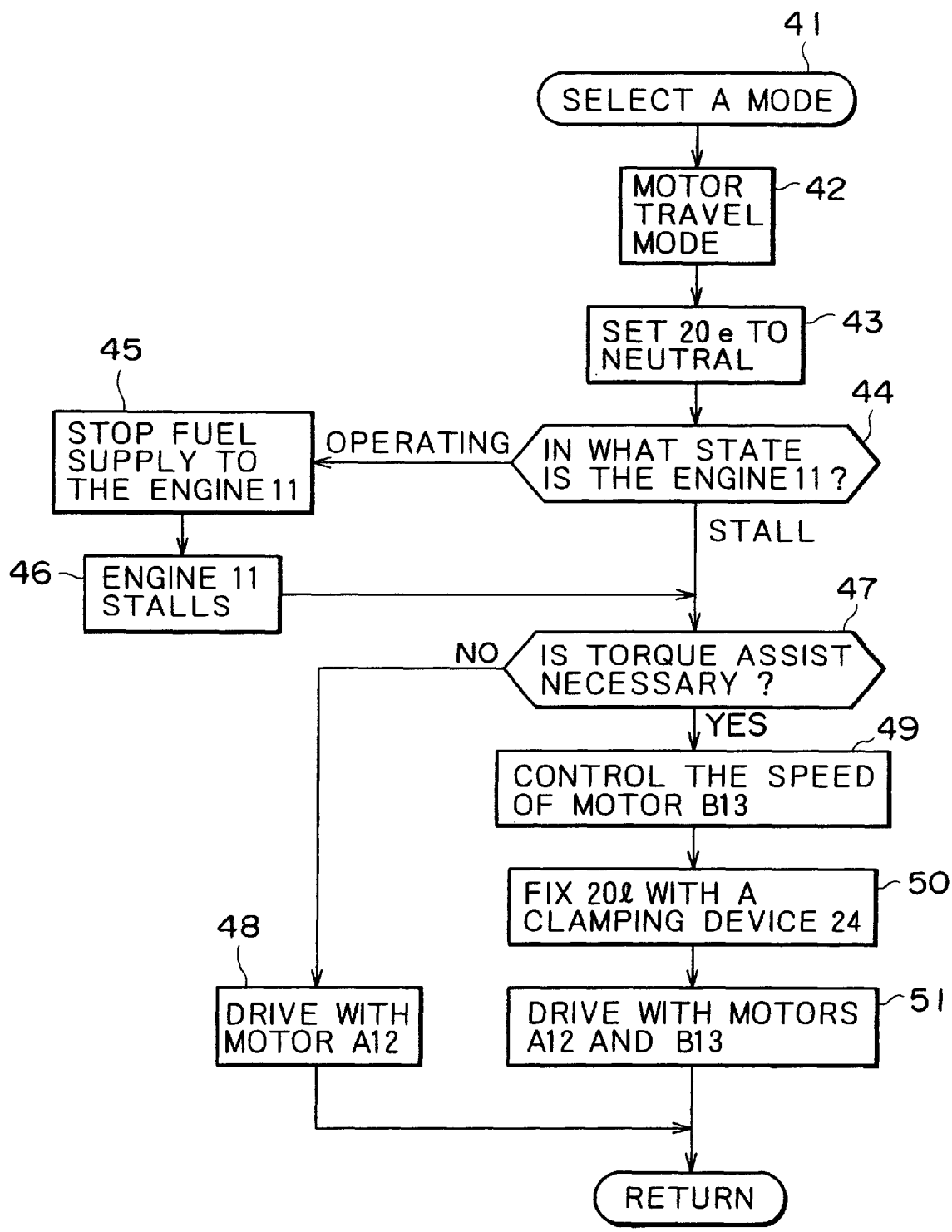
FIG. 2 is a flow chart in a motor travel mode in the system configuration illustrated in FIG. 1.

FIG. 2 is an explanatory diagram relating to a motor travel mode, which mode is selected for start-up and low-speed travel.

In step 41, a most efficient mode is selected on the basis of operating conditions and a residual battery capacity.

In step 42, it is made sure that the motor travel mode has been selected. The mode identifying operation in step 42 may be omitted, but it can be utilized as an indication to the driver of the vehicle.

In step 43, the engine-side transfer element 20e is set neutral upon making sure that the selected mode is the motor travel mode. This identifying operation can be detected by the state-of-connection detecting device 25.

In step 44, the state of the engine 11 is checked If the engine is found to be off, the processing flow shifts to step 47. On the other hand, if the engine 11 is in operation, the flow shifts to step 45, in which the supply of fuel is stopped. The engine is in a no-load condition because the engine-side transfer element 20e is neutral. If the supply of fuel is topped, the operation of the engine stops due to its own friction and a compressing work thereof.

By stopping the supply of fuel to the engine 11 simultaneously with neutralizing the engine-side transfer element 20e, it is possible to prevent blow-up of the engine and vibration caused by variation in torque which is attributable to misfire. The occurrence of vibration and blow-up of the engine can be prevented also by gradually decreasing the supply of fuel up to the time just before neutralizing the engine-side transfer element 20e during operation of the engine 11.

In step 46, the stall of the engine is confirmed and the processing flow shifts to step 47, in which a check is made to see if the required torque exceeds the allowable torque of the motor A12.

If torque assist is not needed, the flow shifts to step 48, in which the vehicle travels with the motor A12 alone. At this time, in the planetary gear 18, the sun gear 18s becomes fixed due to torque balance between gears and a follow-up loss of the motor B13 and an electrical loss are nearly zero.

On the other hand, if torque assist is needed, the flow shifts to step 49, in which the speed of he motor B13 is controlled to make zero the rotational speed of the engine-side transfer element 20e.

In step 50, the low speed-side transfer element 20l is fixed by the clamping device 24. This operation can be confirmed by the clamping state detecting device 27. By fixing the low speed-side transfer element 20l, the torque of the motor B13 is transmitted while being amplified from the sun gear 18s to the ring gear 18r via the planetary gear on the planetary carrier 18p. Thereafter, the processing flow shifts to step 51, in which the vehicle is driven by both motors A12 and B13.

Figure 3:
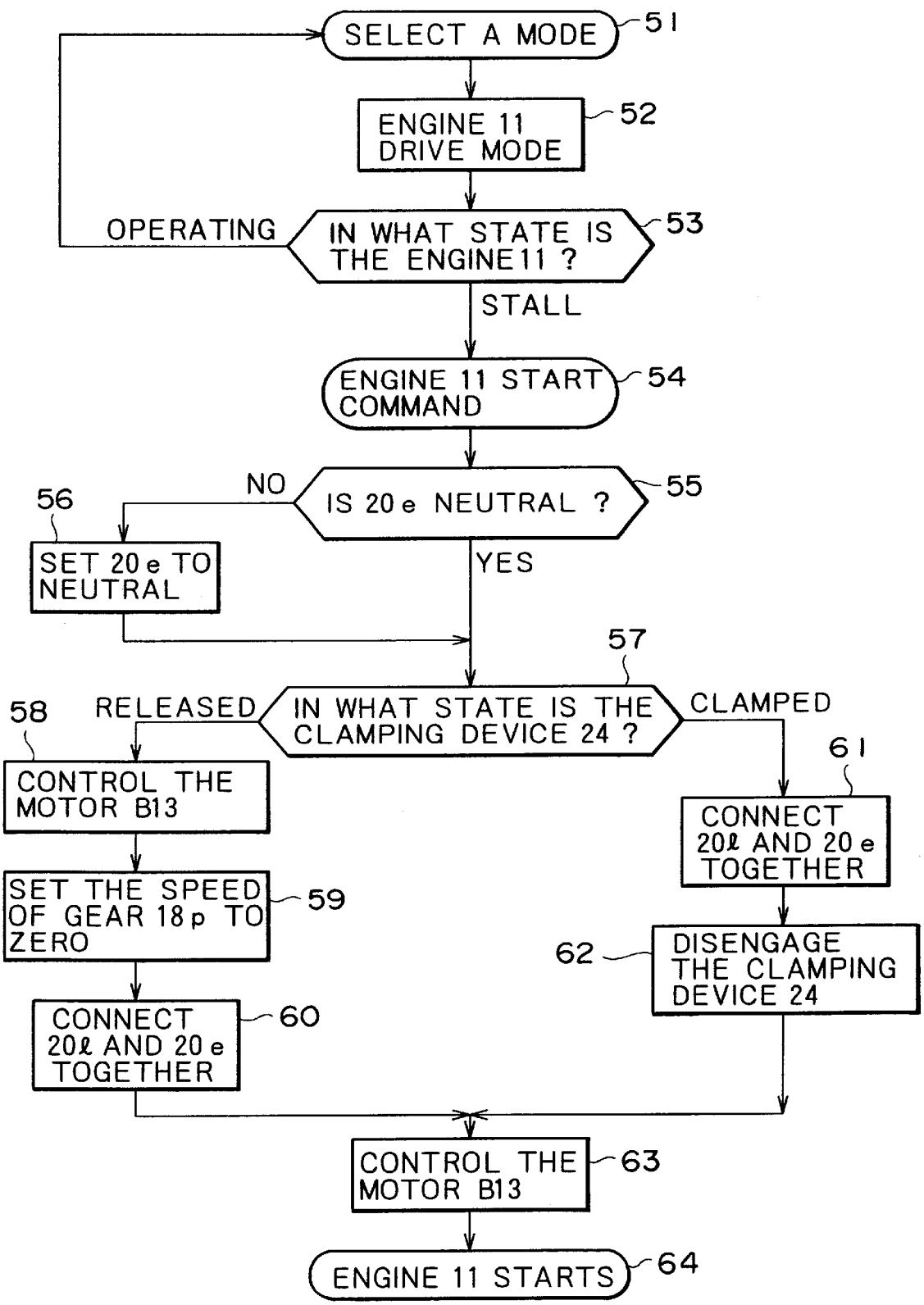
FIG. 3 is a flow chart associated with start-up of an engine in the system configuration illustrated in FIG. 1.

FIG. 3 is an explanatory diagram relating to start-up of the engine. In step 51, an engine drive mode is selected, followed by shifting to step 52.

In step 52, when the engine 11 drive mode is confirmed in step 52, the flow shifts to step 52, in which a start command for the engine 11 is issued.

The mode identifying operation in step 52 may be omitted, but it can be utilized as an indication to the vehicle driver.

In step 53, the state of the engine 11 is checked. If the engine 11 is in operation and the engine-side transfer element 20e is not neutral, the flow returns to step 51, in which the mode selecting operation is performed again. If the engine 11 is off, the flow shifts to step 54, in which a start command for the engine 11 is issued.

In step 55, whether the engine-side transfer element 20e is neutral or not is judged by the state-of-connection detecting device 25, and if the answer is negative, the flow shifts to step 56, in which the engine-side transfer element 20e is made neutral.

When it is detected by the state-of-connection detecting device 25 that the engine-side transfer element 20e is neutral, the flow shifts to step 57, in which the state of the clamping device 24 is checked by the clamping state detecting device 27. If the clamping device 24 is released, the flow shifts to step 58, while if the clamping device 24 clamps the low speed-side transfer element 20l, the flow shifts to step 61.

The reason why the state of the clamping device 24 is checked is that a dog clutch is assumed as the power transfer switching means. In the dog clutch, with the power transfer switching means connected, it is necessary that the components coupled with each other be equal in the number of rotation. Where the clamping device 24 clamps the low speed-side transfer element 20l, the engine-side transfer element 20e disposed on the engine shaft can be connected to the low speed-side transfer element 20l. But if the clamping device 24 is released, that is, if the planetary carrier 18p in the planetary gear 18 is running idle, it is necessary to perform a control so as to make zero the rotational speed of the planetary carrier 18p.

In steps 58 and 59, the number of rotation of the motor B13 is controlled to make zero the rotational speed of the planetary carrier 18p. This operation can be checked by the number-of-rotation detecting device 26.

In step 60, the low speed-side transfer element 20l on the planetary gear side and the engine-side transfer element 20e are coupled together. When the clamping device 24 is found to be in a clamping state and the flow has shifted to step 61, the low speed-side transfer element 20l is coupled to the engine-side transfer element 20e immediately and the flow shifts to step 62, in which the clamped state of the low speed-side transfer element 20l by the clamping device 24 is released.

In step 63, the motor B13 functions as a starter to effect cranking. With the torque of the motor B13 assisted, the torque is used for cranking the engine at the time of shift to the engine start mode, so that the amount of torque assisting the vehicular torque decreases. In this case, the motor A12 generates the torque corresponding to the deficiency to suppress the variation in the vehicular driving torque. In step 64 the engine starts operating.

The system being considered can be realized even in the case where the dog clutch 20 is a pressure mating clutch. Although in case of a pressure mating clutch it is not necessary to synchronize the rotational speeds of power transfer switching components, a large force is required for controlling the power transfer switching components which are coupled together with a large force at the time of coupling. In the dog clutch, a very small force for coupling suffices if the components to be coupled have the same speed.

Figure 4:
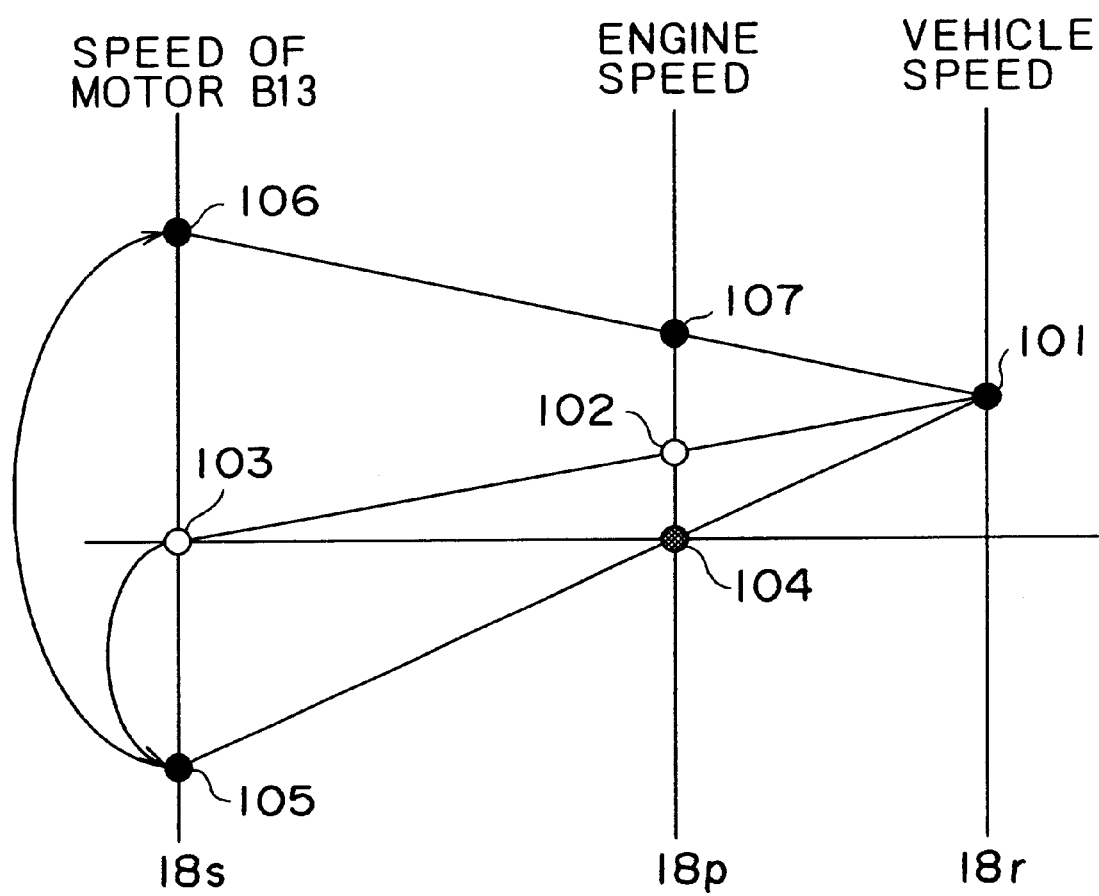
FIG. 4 illustrates operations of components at the time of start-up of the engine in the system configuration shown in FIG. 1.

FIG. 4 is a diagram explaining the rotational speed of the planetary gear at the time of start-up of the engine. In the following description the vehicle is assumed to have been at a rotational speed of 101.

At the beginning, the vehicle runs with a motor alone. With the engine-side transfer element 20e neutral and the clamping device 24 released, the planetary carrier 18p is at a rotational speed of 102, while the sun gear 18s with the motor B13 connected thereto is at a rotational speed of 103 and is stopped.

Upon issuance of an engine start command, the motor B13 rotates in a direction opposite to the vehicle and the sun gear 18s reaches a rotational speed of 105. At this time, the planetary carrier 18p reaches a rotational speed of 104 and stops.

Since the engine is off, the engine-side transfer element 20e and the low speed-side transfer element 20l are coupled together simultaneously with the time when the planetary carrier 18p reaches the rotational speed 104.

Subsequently, the motor B13 rotates in the same direction as the vehicle and the sun gear 18s reaches a rotational speed of 106, resulting in that the engine 11 comes into a cranking state at a rotational speed of 107 and thus can be started.

Since this description explains the rotation in the planetary gear, the rotational direction of the engine is not always coincident with the actual operating direction of the vehicle, including a final gear and a differential gear.

Figure 5:
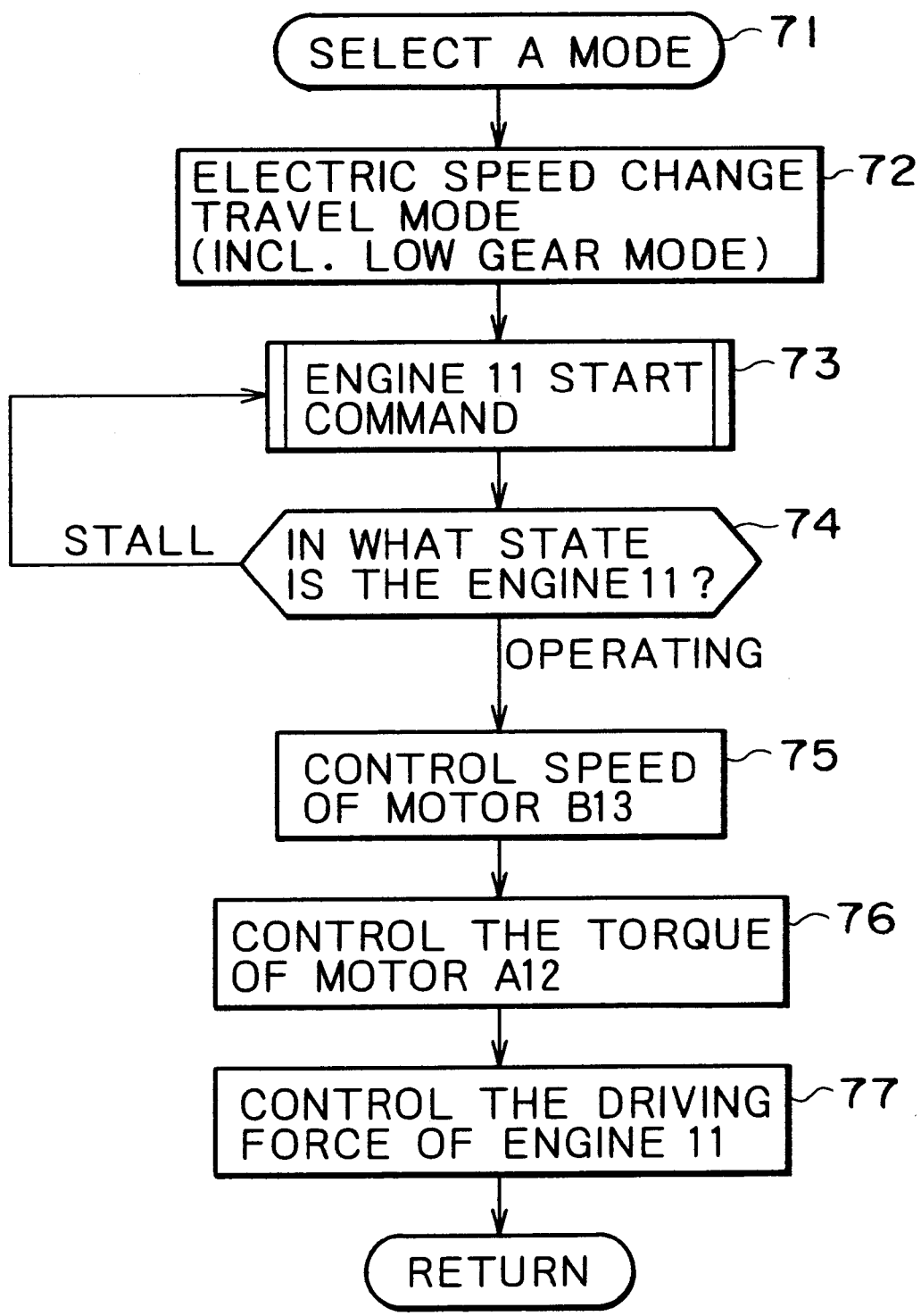
FIG. 5 is a flow chart in an electric speed change mode in the system configuration illustrated in FIG. 1.

FIG. 5 illustrates an electric speed change mode. In this mode, the driving force of the engine is divided into a generated power and a direct driving force by the differential mechanism, and the generated power is fed as a driving force for the motor A12 which is connected to the vehicle driving shaft 15. By controlling the balance between the direct driving force and the generated power it becomes possible to effect a stepless speed change while allowing an operating point of the engine to remain fixed.

In step 71 the electric speed change mode is selected, followed by shifting to step 72.

When the electric speed change mode is confirmed in step 72, a start command for the engine 11 is issued in step 73 to start the engine 11.

Subsequently, in step 74 the state of operation of the engine 11 is checked, and if the engine is off, the processing flow shifts again to step 73.

If the engine 11 is starting, the flow shifts to step 75, in which the speed of the motor B13 is controlled to determine the vehicle speed. A vehicular driving torque is determined by controlling the torque of the motor A12 in step 76. At this time, the motor B13 is in a power generating state, which generated power is used as a driving force for the motor A12.

In this way a stepless speed change is realized. Upon issuance of a request for the vehicle driving force, the flow shifts to step 77, in which the output of the engine is controlled.

At the maximum vehicle speed in the electric speed change mode, the generated power of the motor B13 is made zero, the sun gear 18s in the planetary gear 18 is fixed electrically by the motor B13, and the driving force of the engine 11 is transmitted to the vehicle via the planetary carrier 18*p*, ring gear 18*r*, and low speed vehicle-side gear 19.

Figure 6:
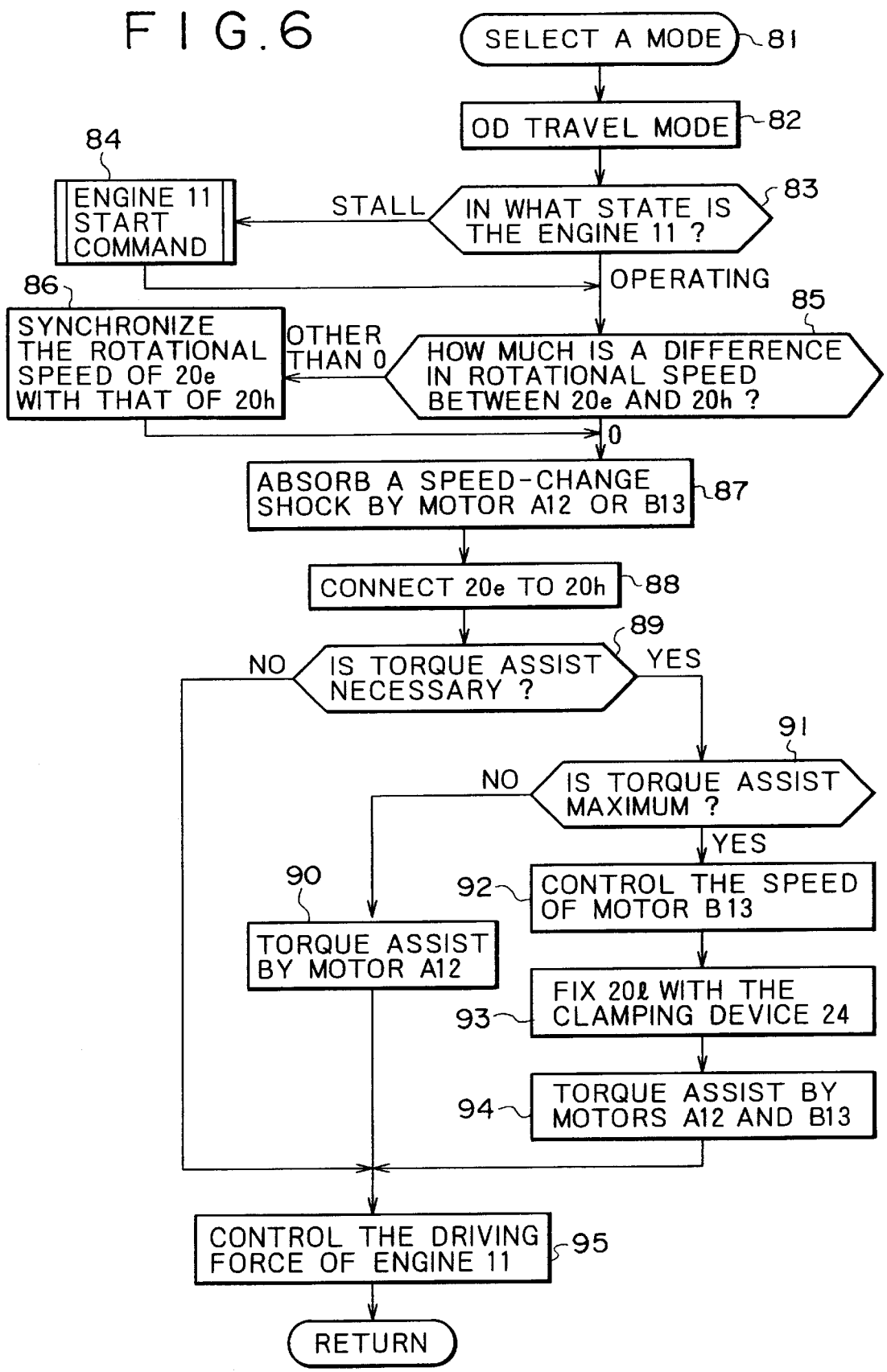
FIG. 6 is a flow chart in an OD mode in the system configuration illustrated in FIG. 1.

FIG. 6 is a diagram explanatory of an overdrive (OD) mode.

In the OD mode, the driving force of the engine is transmitted to the vehicle at a speed change ratio smaller than the minimum speed change ratio capable of being realized in the electric speed change mode.

The OD mode is selected in step 81, followed by shifting to step 82. When the OD mode is confirmed in step 82, the flow shifts to step 83, in which the state of the engine 11 is judged.

If the engine 11 stalls, the flow shifts to step 84, in which there issues a start command for the engine 11, causing the engine to start.

In step 85, the rotational speed of the engine-side transfer element 20*e* and that of the high speed-side transfer element 20*h* are detected. If there is any difference between both rotational speeds, the flow shifts to step 86, in which the motors A12, B13 and the engine 11 are controlled their rotations to synchronize the rotational speed of the engine-side transfer element 20*e* with that of the high speed-side transfer element 20*h*.

Upon coincidence in the rotational speed between both transfer elements 20*e* and 20*h*, the flow shifts to step 88, in which both transfer elements are coupled together.

A deficiency in the vehicle driving torque which occurs during speed change is made up for by assisting of the motor torque.

As a result of coupling of the engine-side transfer element 20*e* and the high speed-side transfer element 20*h* the low speed-side transfer element 20*l* becomes free, the sun gear 18*s* in the planetary gear 18 stops due to torque balance in the planetary gear, and the rotation of the motor B13 stops.

Next, the flow shifts to step 89, in which there is made judgment as to whether it is necessary to assist torque by a motor. If the answer is affirmative, the flow shifts to step 91, in which it is judged whether the requested vehicle driving torque exceeds the allowable torque of the motor A12. If the requested vehicle driving torque is within the allowable torque range of te motor A12, the flow shifts to step 90, in which torque is assisted with the motor A12 alone.

If the requested vehicle driving torque exceeds the allowable torque range of the motor A12, the flow shifts to step 92, in which the speed of the motor B13 is controlled to make zero the rotational speed of the engine-side transfer element 20*e*.

Thereafter, the flow shifts to step 93, in which the engine-side transfer element 20*e* is fixed by the clamping device 24. As a result, the torque of the motor B13 is transmitted to the vehicle by the low speed vehicle-side gear 19 via the sun gear 18*s* and ring gear 18*r*. In step 95, the engine 11 is controlled.

Figure 7:
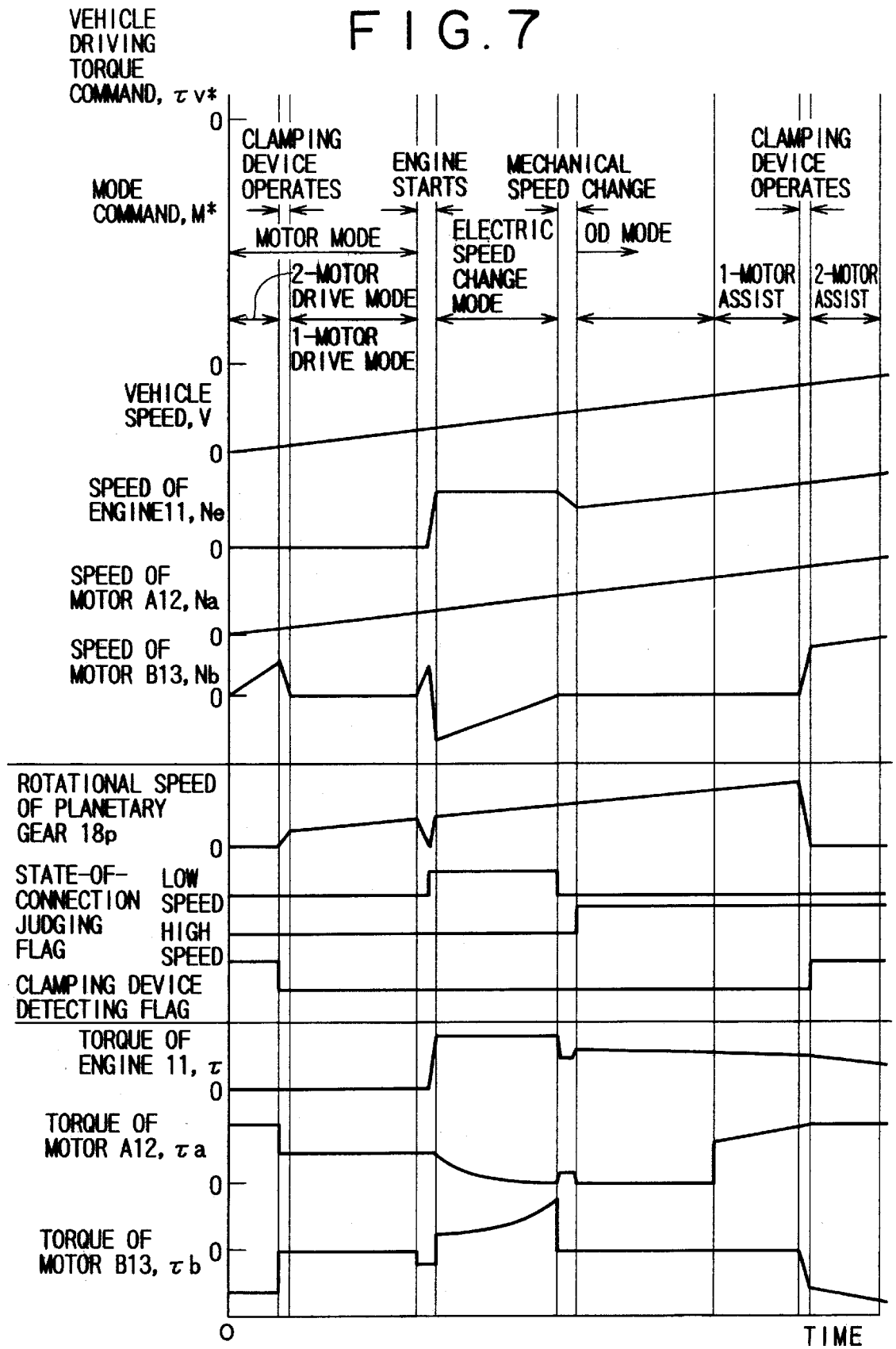
FIG. 7 is a time chart in the system configuration illustrated in FIG. 1.

FIG. 7 shows an example of a time chart in which the operations of components used in this embodiment are illustrated in a time-series arrangement. A vehicle driving torque command τv* is constant and the vehicle stops at time 0.

For start-up of the vehicle it is necessary to use a driving force larger than both static friction and vehicular inertia, so there is selected a 2-motor drive mode, Since the planetary carrier 18*p* in the planetary gear 18 is fixed by the clamping device 24, there arises a clamping device detecting flag.

The motors A12 and B13 are both in a state of power running. The torque τb of the motor B13 is positive in the power generating direction. The power transfer switching means is assumed to be a dog clutch.

There is adopted a 1-motor drive mode in which the vehicle travels with the motor A12 alone as the required driving torque becomes smaller after the vehicle begins to travel. In shifting from 2-motor drive mode to 1-motor drive mode, the supply of an electric current to the motor B13 is stopped and the clamping device 24 is disengaged. In the 1-motor drive mode, the motor B13 connected to the planetary gear 18 turns off due to torque balance.

When starting the engine, the speed of the motor B13 is controlled to make zero the speed of the planetary carrier 18*p*. Subsequently, the engine-side transfer element 20*e* and the low speed-side transfer element 20*l* are coupled together and a shift is made to the electric speed change mode. At this time there arises a low speed side of a state-of-connection judging flag.

In the electric speed change mode, a part of the engine output is generated by the motor B13, and the motor A12 is driven using the power generated by the motor B13. In the same mode, the vehicle speed increases in inverse proportion to the number of rotation of the motor B13 and a maximum speed is reached when the rotational speed of the motor B13 is zero.

As the vehicle speed further increases, a shift is made from the electric speed change mode to the OD mode by operation of the power transfer switching means. The engine-side transfer element 20*e* is separated from the low speed-side transfer element 20*l* but is connected to the high speed-side transfer element 20*h*.

In this case, it is necessary that the number of rotation of the engine-side transfer element 20*e* and that of the high speed-side transfer element 20*h* be coincident with each other. Simultaneously with the separation of the engine-side transfer element 20*e* the throttle valve of the engine 11 is turned back, and when the number of rotational speed of the engine 11 decreases to a predetermined number, the engine-side transfer element 20*e* is connected to the high speed-side transfer element 20*h*. At this time there arises a high speed side of the state-of-connection judging flag.

The engine torque is not transmitted to the vehicle until connection of both transfer elements 20*e* and 20*h* with each other. Therefore, the torque generated by the motor A12 is increased to prevent the occurrence of a shock caused by a deficiency of torque in speed change.

In the OD mode, the torque generated by the engine becomes smaller as the vehicle speed increases. Therefore, in the event of engine torque deficiency in a high-speed vehicular running, the torque is assisted by a motor.

If a required driving torque is within an allowable torque range of the motor A12, electric power is fed to the motor A12 to effect torque assist.

On the other hand, if the required driving torque exceeds the allowable torque range of the motor A12, the planetary carrier 18*p* is fixed by the clamping device 24 and the torque of the motor B13 is transmitted to the vehicle driving shaft. Since the planetary carrier 18*p* in the planetary gear 18 is fixed by the clamping device 24, there arises the clamping device detecting flag.

If the speed of the motor B13 is controlled to make the speed of the planetary carrier 18*p*, zero for coupling prior to fixing the planetary carrier 18*p* by the clamping device 24, it becomes possible to effect a shock-free mode shift.

Other embodiments of hybrid vehicles carrying the transmission according to the present invention will be described below.

Figure 8:
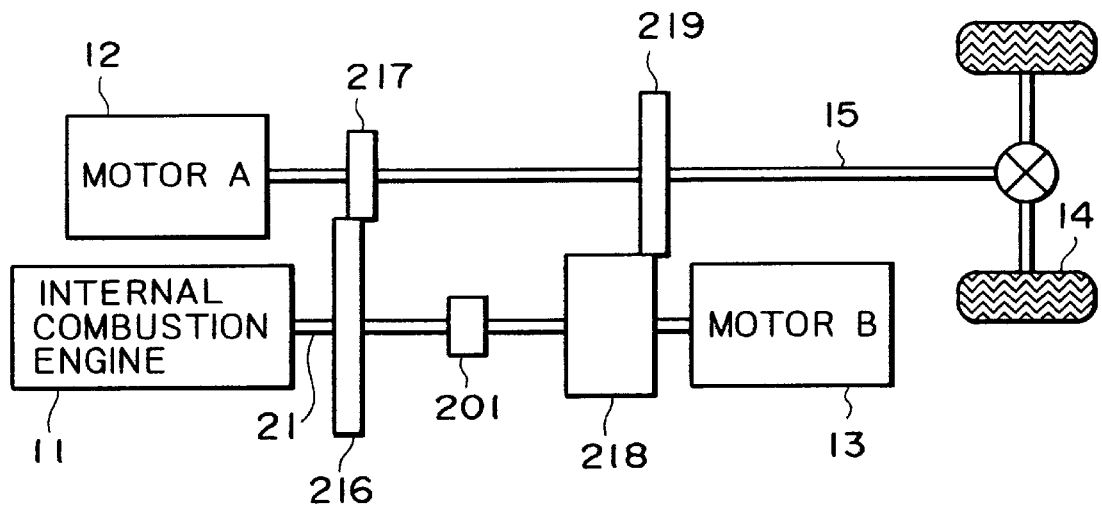
FIG. 8 illustrates a system configuration of a hybrid vehicle according to another embodiment of the present invention.

FIG. 8 shows another embodiment of a vehicle carrying the transmission according to the present invention. As shown in the same figure, a connecting device 201 is disposed between a high speed gear 216 and a differential mechanism 218, with the motor B13 being connected to the differential mechanism 218. The output shaft 21 of the engine 11 is connected or is made neutral to the high speed gear 216 or to the differential mechanism 218 by the connecting mechanism 201, whereby the driving force of the engine is distributed.

Figure 9:
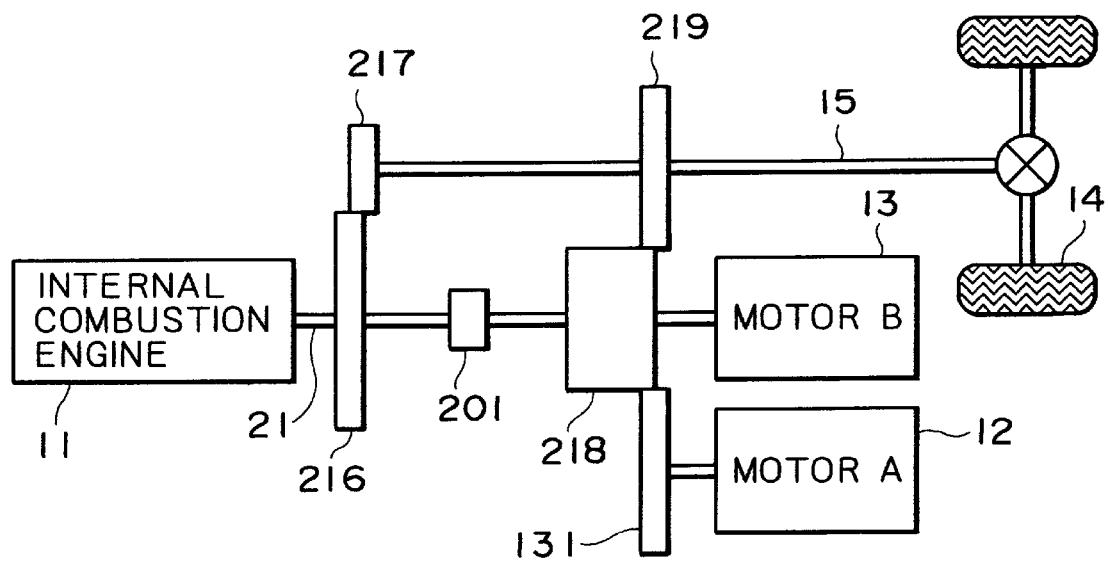
FIG. 9 illustrates a system configuration of a hybrid vehicle according to a further embodiment of the present invention.

FIG. 9 shows a further embodiment of a vehicle carrying the transmission according to the present invention. As shown in the same figure, a connecting device 201 is disposed between a high speed gear 216 and a differential mechanism 218, the motor B13 is connected to one gear in the differential mechanism 218, and the motor A12 is connected to one gear in the differential mechanism 218 via a gear 131. The motor A12 can be made compact because the connection thereof to the differential mechanism 218 is made through the gear 131.

Figure 10:
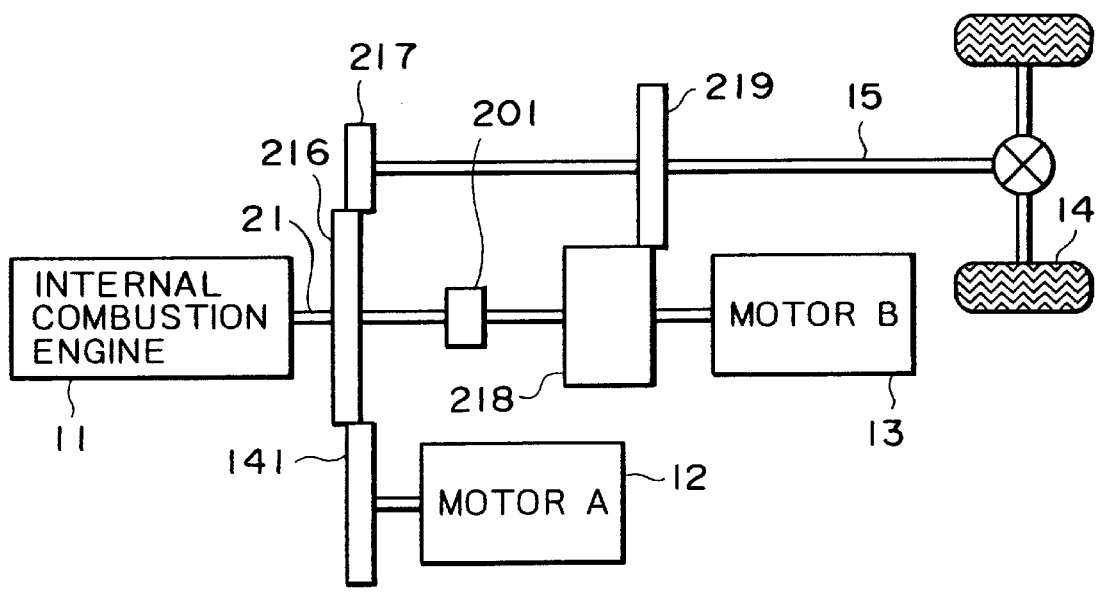
FIG. 10 illustrates a system configuration of a hybrid vehicle according to a still further embodiment of the present invention.

FIG. 10 shows a still further embodiment of a vehicle carrying the transmission according to the present invention. As shown in the same figure, a connecting device 201 is disposed between a high speed gear 216 and a differential mechanism 218, the motor B13 is connected to the differential mechanism 218, and the motor A12 is connected to the high speed gear 216 via a gear 141. The motor A12 can be made compact because it is connected to the high speed gear 216 through the gear 141.

Figure 11:
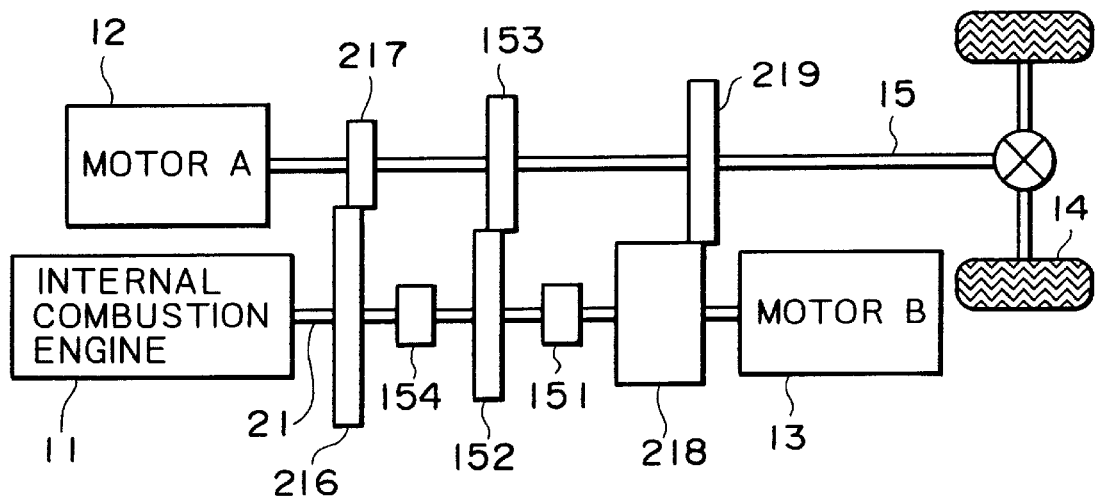
FIG. 11 illustrates a system configuration of a hybrid vehicle according to a still further embodiment of the present invention.

FIG. 11 shows a still further embodiment of a vehicle carrying the transmission according to the present invention. As shown in the same figure, a connecting device 154, a medium speed gear 152, and a connecting device 151 are disposed between a high speed gear 216 and a differential mechanism 218, the medium speed gear 152 being in mesh with a gear 153 which is mounted on the vehicle driving shaft 15.

The connecting device 154 has a function of connecting or neutralizing the engine output shaft 21 with respect to the high speed gear 216, and the connecting device 151 has a function of connecting or neutralizing the engine output shaft 21 with respect to the high speed gear 216 or the differential mechanism 218.

By setting the speed change ratio between the medium speed gear 152 and the gear 153 at a value lower than the speed change ratio between the high speed gears 216 and 217, the number of mechanical speed change modes increases by one stage and thus the region of the electric speed change mode can be made narrow without impairing the power performance, with the result that it is possible to reduce the capacity of the motor A12 and that of the motor B13.

Figure 12:
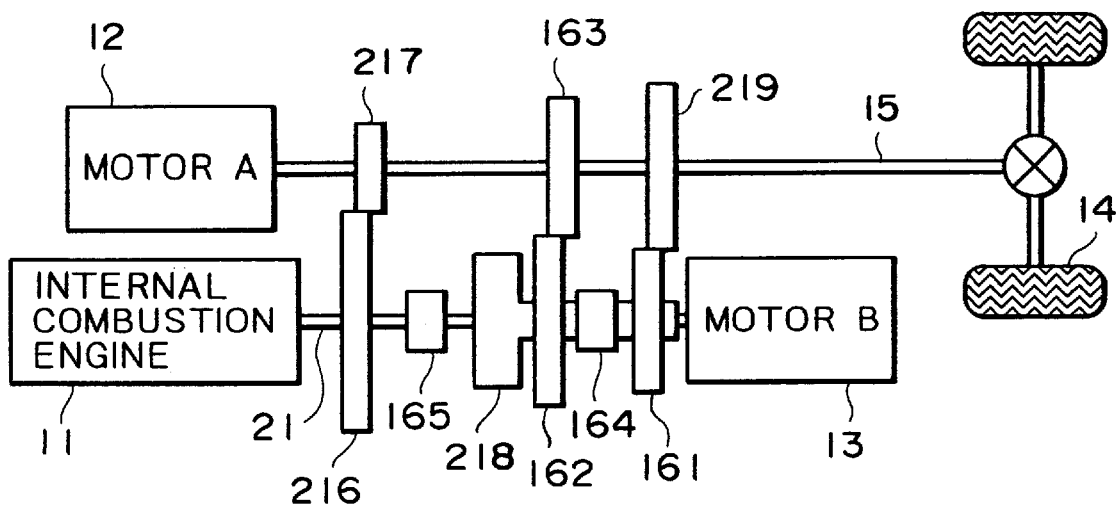
FIG. 12 illustrates a system configuration of a hybrid vehicle according to a still further embodiment of the present invention.

FIG. 12 shows a still further embodiment of a vehicle carrying the transmission according to the present invention. As shown in the same figure, a differential mechanism 218 has a low speed gear 161 and a low/medium speed gear 162. The low speed gear 161 is in mesh with a gear 219 which is mounted on the vehicle driving shaft 15, while the low/medium speed gear 162 is in mesh with a gear 163 also mounted on the shaft 15.

A connecting device 164 is disposed between the low speed gear 161 and the low/medium speed gear 162. The connecting device 164 has a function of connecting or neutralizing an output of the differential mechanism 218 with respect to the low speed gear 161 or the low/medium speed gear 162.

Consequently, it becomes possible for the region of the electric speed change mode to be enlarged from the speed change ratio between the low speed gear 161 and the gear 219 up to the speed change ratio between the low/medium speed gear 162 and the gear 163.

Figure 13:
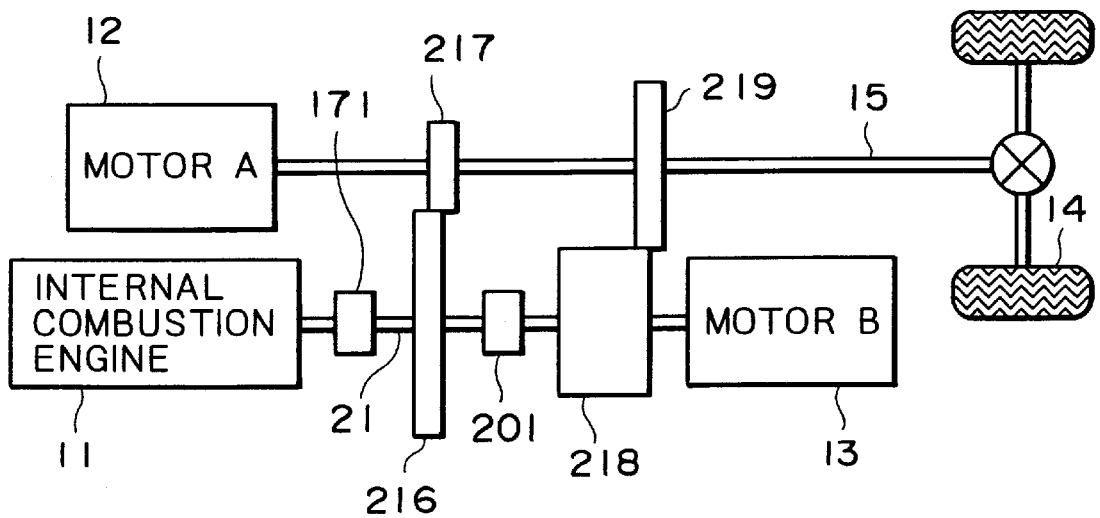
FIG. 13 illustrates a system configuration of a hybrid vehicle according to a still further embodiment of the present invention.

FIG. 13 shows a still further embodiment of a vehicle carrying the transmission according to the present invention. As shown in the same figure, the engine output shaft 21 has a clutch 171, so that even in the event of failure of the connecting device 201, motor A12 and motor B13, the vehicle can be stopped, by releasing the clutch 171, without stopping the engine 11.

Figure 14:
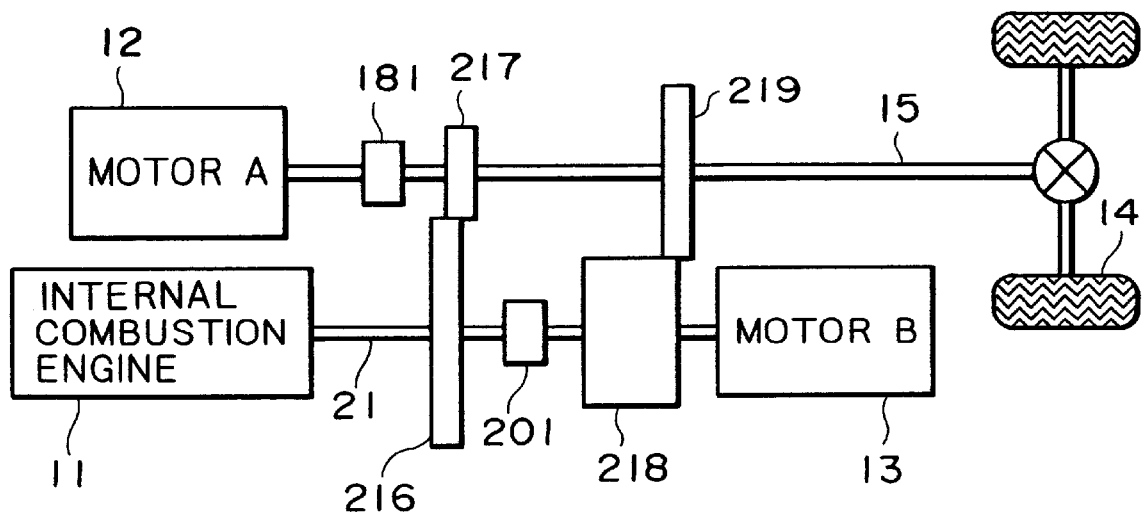
FIG. 14 illustrates a system configuration of a hybrid vehicle according to a still further embodiment of the present invention.

FIG. 14 shows a still further embodiment of a vehicle carrying the transmission according to the present invention. As shown in the same figure, the motor A12 is connected to the vehicle driving shaft 15 via a clutch 181. By releasing the clutch 181 it becomes possible to make a follow-up loss associated with the motor A12 nearly zero in the mode wherein the output of the internal combustion engine is transmitted to the vehicle driving shaft via a high speed gear 216 and a gear 217.

Figure 15:
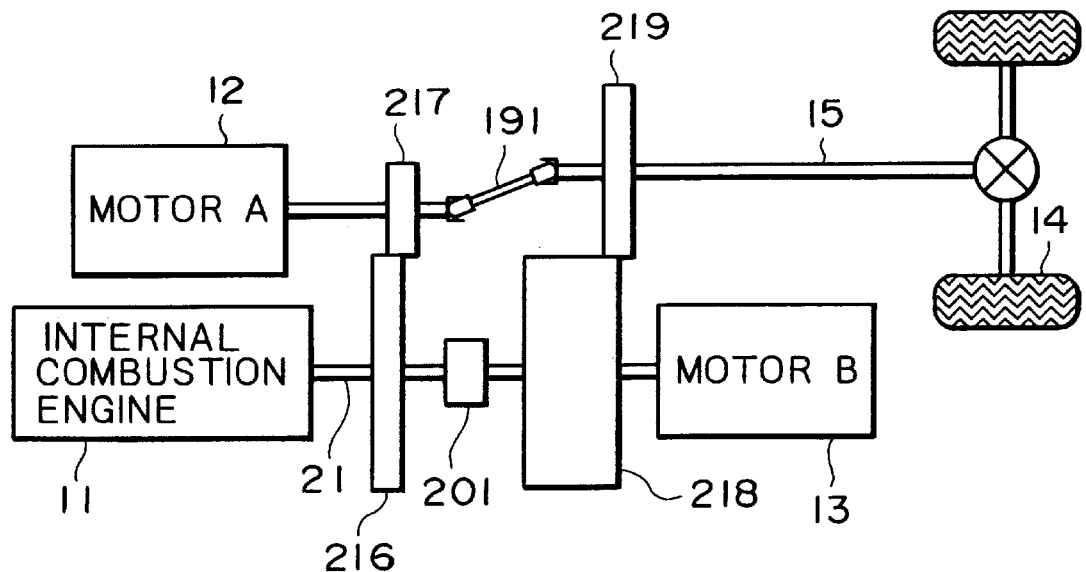
FIG. 15 illustrates a system configuration of a hybrid vehicle according to a still further embodiment of the present invention.

FIG. 15 shows a still further embodiment of a vehicle carrying the transmission according to the present invention. As shown in the same figure, the axis of a gear 217 and that of a gear 219 are offset from each other according to sizes of a differential mechanism 218 and a high speed gear 216. Therefore, the gears 217 and 216 are connected together using a universal joint 191.

Figure 16:
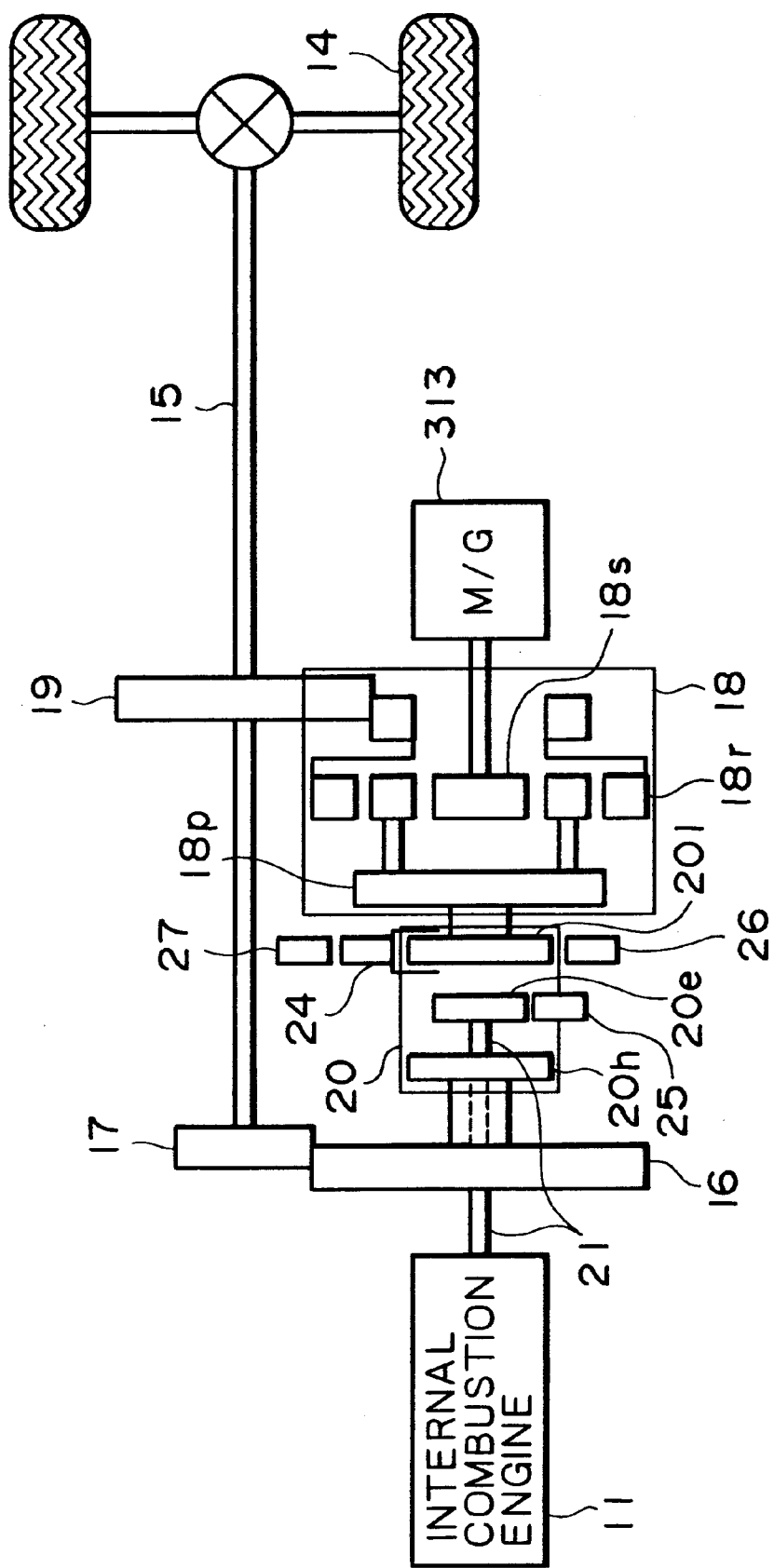
FIG. 16 illustrates a system configuration of a vehicle driving system according to a still further embodiment of the present invention.

FIG. 16 shows a still further embodiment of the present invention, in which one motor is used as a motor generator 313. According to this embodiment, when an engine-side transfer element 20e is connected to a high speed-side transfer element 20h, it becomes possible to avoid a follow-up loss associated with the motor generator 313. Regeneration of the motor generator 313 can be effected by locking a low speed-side transfer element 201.

Figure 17:
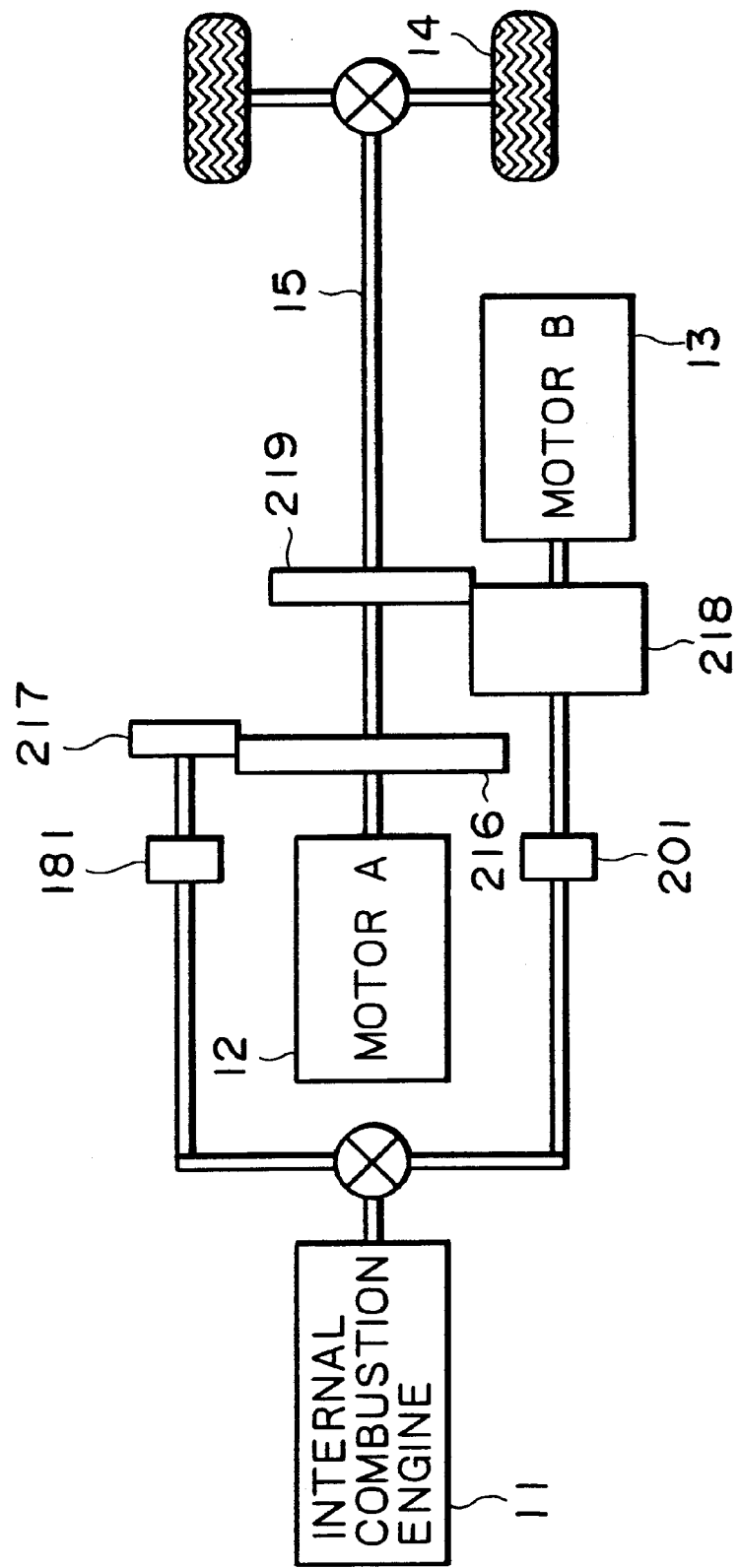
FIG. 17 illustrates a system configuration of a hybrid vehicle according to a still further embodiment of the present invention.

FIG. 17 shows a still further embodiment of the present invention. As shown in the same figure, the hybrid vehicle of this embodiment has a path for transmitting the driving force of the engine 11 directly to a vehicle driving shaft 15 and a path for transmitting the driving force of the engine 11 to the vehicle driving shaft 15 through a differential mechanism 218 with a motor B13 connected to one shaft thereof. With this constitution, on a high speed side it is possible to use the driving force of the engine with less loss, while on a low speed side, stepless speed change using the differential mechanism can be realized, thereby allowing the engine to always run in a highly efficient region.

Although the present invention has been described above by way of embodiments of vehicles carrying the transmission according to the invention, it goes without saying that the present invention is also applicable to other transportation means such as ships and trains.

According to the above embodiments it is possible to diminish a follow-up loss of the power generating motor; besides, since the torque can be assisted by the power generating motor, a hybrid vehicle superior in its accelerating performance can be provided at a low fuel consumption.

What is claimed is:

1. A transmission comprising:
   a first power transfer path for transferring an output of an internal combustion engine to a vehicle driving shaft through a differential mechanism in which power of an electric rotary machine is transferred to one of rotary elements;
   a second power transfer path for transferring the output of said internal combustion engine to said vehicle driving shaft through gears; and a power transfer switching means for switching over said first and second power transfer paths from one to the other.

2. A transmission according to claim 1, wherein said power transfer switching means has a neutral mode in which the output of said internal combustion engine is separated from both said first and second power transfer paths.

3. A transmission according to claim 1, further including a lock mechanism for restricting the rotation of a rotary element in said differential mechanism which rotary element is located on the internal combustion engine side.

4. A transmission according to claim 1, wherein said power transfer switching means is a dog clutch.

5. A vehicle having an internal combustion engine and an electric rotary machine, said vehicle comprising:
- a vehicle driving shaft to which are fixed at least a high speed gear and a low speed gear;
- a planetary gear having at least three rotary elements, of which a first rotary element is connected to said low speed gear and a second rotary element is connected to a rotating shaft of said electric rotary machine; and
- a dog clutch having at least three rotary elements, of which a first rotary element is connected to a rotating shaft of said internal combustion engine, a second rotary element is connected to said high speed gear, and a third rotary element is connected to a third rotary element of said planetary gear;
- said dog clutch having a mechanism for selectively connecting the first rotary element thereof to the second or the third rotary element thereof and for neutralizing the first rotary element relative to the second and third rotary elements.

6. A vehicle according to claim 5, further including a lock mechanism for restricting the rotation of the third rotary element in said dog clutch.

7. A vehicle having an internal combustion engine and a motor generator, said vehicle comprising:
- a first power transfer path for transferring an output of said internal combustion engine to a vehicle driving shaft through a differential mechanism in which power of said motor generator is transferred to one of rotary elements;
- a second power transfer path for transferring the output of said internal combustion engine to said vehicle driving shaft through gears; and
- a dog clutch for switching over from one to another among a first mode which selects said first power transfer path, a second mode which selects said second power transfer path, and a neutral mode which separates said internal combustion engine from the first and second power transfer paths.

8. A vehicle having an internal combustion engine and a motor generator, said vehicle comprising:
- a vehicle driving shaft to which are fixed at least a high speed gear and a low speed gear;
- a planetary gear having at least three rotary elements, of which a first rotary element is connected to said low speed gear and a second rotary element is connected to a rotating shaft of said motor generator; and
- a dog clutch having at least three rotary elements, of which a first rotary element is connected to a rotating shaft of said internal combustion engine, a second rotary element is connected to said high speed gear, and a third rotary element is connected to a third rotary element in said planetary gear;
- said dog clutch having a mechanism for selectively connecting the first rotary element thereof to the second or the third rotary element thereof and for neutralizing the first rotary element relative to the second and third rotary elements.

9. A hybrid vehicle comprising:
- an internal combustion engine;
- a plurality of electric rotary machines;
- a first drive path through which an output obtained by the addition of an output of said internal combustion engine and an output of the first electric rotary machine is transferred to a vehicle driving shaft;
- a second drive path through which an output obtained by subtracting one of an output of said internal combustion engine and an output of the second electric rotary machine from the other is transferred to said vehicle driving shaft; and
- means for selecting either said first or said second drive path.

10. A control unit provided in a hybrid vehicle, said hybrid vehicle comprising:
- an internal combustion engine;
- an electric rotary machine;
- a vehicle driving shaft to which are fixed at least a high speed gear and a low speed gear;
- a planetary gear having at least three rotary elements, of which a first rotary element is connected to said low speed gear and a second rotary element is connected to a rotating shaft of a motor generator; and
- a dog clutch having at least three rotary elements, of which a first rotary element is connected to a rotating shaft of said internal combustion engine, a second rotary element is connected to said high speed gear, and a third rotary element is connected to a third rotary element of said planetary gear; said dog clutch having a mechanism for selectively connecting the first rotary element thereof to the second or the third rotary element thereof and for neutralizing the first rotary element relative to the second and third rotary elements,
- wherein the number of rotation of the third rotary element in said dog clutch is controlled in accordance with a detected number of rotation of said vehicle driving shaft and by controlling the number of rotation of said electric rotary machine, and the first and third rotary elements in said dog clutch are connected together upon substantial coincidence in the number of rotation of the two.

11. A control unit provided in a hybrid vehicle, said hybrid vehicle comprising;
- an internal combustion engine;
- an electric rotary machine;
- a vehicle driving shaft to which are fixed at least a high speed gear and a low speed gear;
- a planetary gear having at least three rotary elements, of which a first rotary element is connected to said low speed gear and a second rotary element is connected to a rotating shaft of a motor generator; and
- a dog clutch having at least three rotary elements, of which a first rotary element is connected to a rotating shaft of said internal combustion engine, a second rotary element is connected to said high speed gear, and a third rotary element is connected to a third rotary element in said planetary gear; said dog clutch having a mechanism for connecting the first rotary element thereof to the second or the third rotary element thereof selectively and for neutralizing the first rotary element relative to the second and third rotary elements and a locking mechanism which restricts the number of rotation of the third rotary element in the dog clutch, wherein the number of rotation of the third rotary element in the dog clutch is controlled in accordance with a detected number of rotation of said vehicle driving shaft and by controlling the number of rotation of said electric rotary machine, and said locking mechanism is operated upon substantial stop of rotation of the third rotary element in said dog clutch.

12. A transmission according to claim 2, wherein said power transfer switching means is a dog clutch.

13. A transmission according to claim 3, wherein said power transfer switching means is a dog clutch.

\* \* \* \* \*